(12) United States Patent
Thill et al.

(10) Patent No.: US 9,537,984 B2
(45) Date of Patent: Jan. 3, 2017

(54) RADIO-FREQUENCY COMMUNICATION DEVICE COMPRISING A POWER SUPPLY OF ASSISTED RADIO-FREQUENCY ORIGIN

(75) Inventors: Michel Thill, Montreuil (FR); Christophe Arnoux, Auriol (FR)

(73) Assignee: GEMALTO SA, Meudon (FR)

(*) Notice: Subject to any disclaimer, the term of this patent is extended or adjusted under 35 U.S.C. 154(b) by 116 days.

(21) Appl. No.: 14/114,912

(22) PCT Filed: Apr. 27, 2012

(86) PCT No.: PCT/EP2012/057850
§ 371 (c)(1),
(2), (4) Date: Jan. 23, 2014

(87) PCT Pub. No.: WO2012/152606
PCT Pub. Date: Nov. 15, 2012

(65) Prior Publication Data
US 2014/0155125 A1 Jun. 5, 2014

(30) Foreign Application Priority Data

May 6, 2011 (EP) ..................... 11305541

(51) Int. Cl.
*H04B 5/00* (2006.01)
*H04M 1/02* (2006.01)
*G06K 19/07* (2006.01)

(52) U.S. Cl.
CPC ........ *H04M 1/0262* (2013.01); *G06K 19/0723* (2013.01); *G06K 19/0701* (2013.01); *H04B 5/0037* (2013.01)

(58) Field of Classification Search
CPC ............ G06K 19/0723; G06K 19/0701; G06K 19/0705; H04B 5/0025; H04B 5/0031; H04B 5/0037; H04B 5/0056; H04B 5/0062
(Continued)

(56) References Cited

U.S. PATENT DOCUMENTS 6,282,407 B1 * 8/2001 Vega .................. G06K 7/10435
455/41.1
6,791,398 B1 * 9/2004 Lin et al. ...................... 327/544
(Continued)

FOREIGN PATENT DOCUMENTS

DE 102007019272 A1 10/2007
EP 2088540 A1 8/2009
JP 08-055198 A 2/1996

OTHER PUBLICATIONS

International Search Report (PCT/ISA/210) mailed on Oct. 29, 2012, by the European Patent Office as the International Searching Authority for International Application No. PCT/EP2012/057850.
(Continued)

*Primary Examiner* — Duc M Nguyen
(74) *Attorney, Agent, or Firm* — Buchanan Ingersoll & Rooney PC

(57) ABSTRACT

A radio-frequency communication device includes connection means electrically connecting an integrated circuit component, or intended for this purpose; and selection means for selecting an electromagnetic current power supply for the component. The device includes an alternative power supply source for powering the component during the reception of an electromagnetic field as soon as the electromagnetic power supply current received by the component is insufficient.

17 Claims, 3 Drawing Sheets

(58) Field of Classification Search
USPC ........ 455/41.1, 41.2, 571–574, 343.1–343.5; 340/10.1
See application file for complete search history.

(56) References Cited

U.S. PATENT DOCUMENTS

| | | | |
|---|---|---|---|
| 7,724,145 B2* | 5/2010 | Batra ................. | G06K 19/0702 235/375 |
| 2005/0078498 A1* | 4/2005 | Waters ............... | G06K 19/0723 365/1 |
| 2005/0136972 A1* | 6/2005 | Smith et al. ............... | 455/554.1 |
| 2005/0237198 A1* | 10/2005 | Waldner ............ | G06K 19/0707 340/572.7 |
| 2007/0018832 A1* | 1/2007 | Beigel et al. .............. | 340/572.7 |
| 2008/0100423 A1* | 5/2008 | Geissler ............ | G06K 19/0707 340/10.1 |
| 2008/0136596 A1* | 6/2008 | Yeo et al. .................... | 340/10.1 |
| 2009/0309705 A1* | 12/2009 | Kimura ........................ | 340/10.1 |
| 2009/0315510 A1* | 12/2009 | Dos Santos ............. | H02J 7/025 320/107 |
| 2010/0231407 A1* | 9/2010 | Carr .......................... | 340/691.1 |
| 2010/0290368 A1* | 11/2010 | Meier et al. .................. | 370/278 |
| 2010/0291871 A1* | 11/2010 | Butler .......................... | 455/41.1 |
| 2010/0327945 A1* | 12/2010 | Caruana et al. ............. | 327/427 |
| 2012/0108168 A1* | 5/2012 | Metivier ...................... | 455/41.1 |
| 2012/0313758 A1* | 12/2012 | Savarese ............ | G06K 7/10079 340/10.1 |

OTHER PUBLICATIONS

Written Opinion (PCT/ISA/237) mailed on Oct. 29, 2012, by the European Patent Office as the International Searching Authority for International Application No. PCT/EP2012/057850.

* cited by examiner

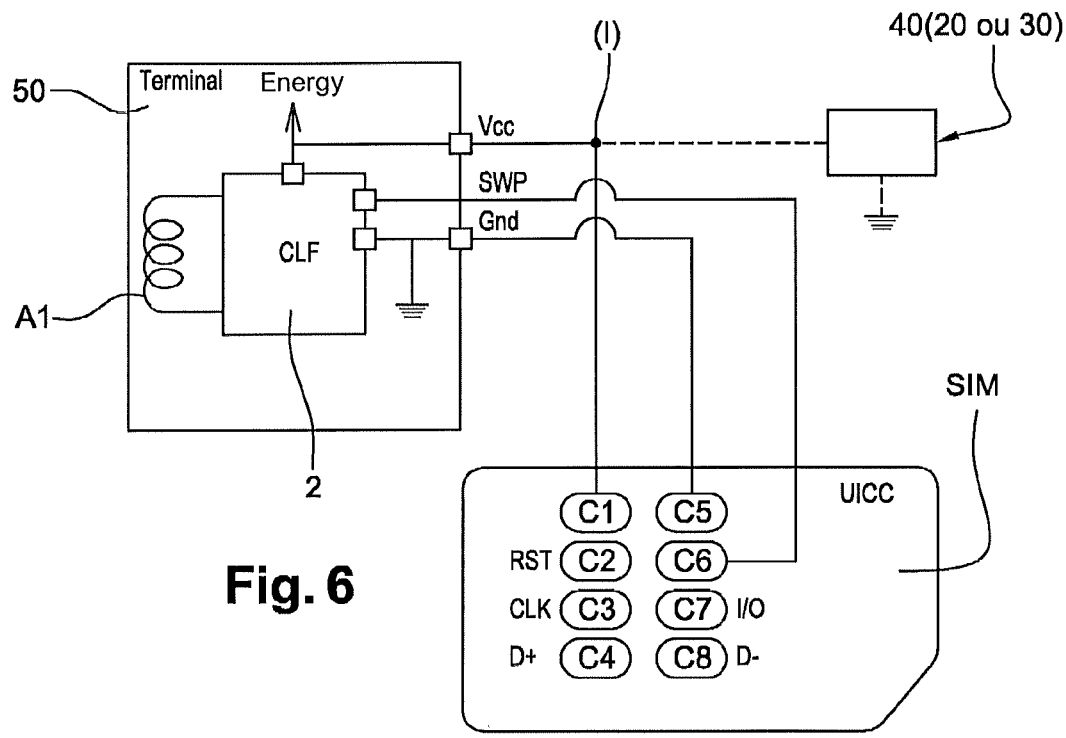
Fig. 6
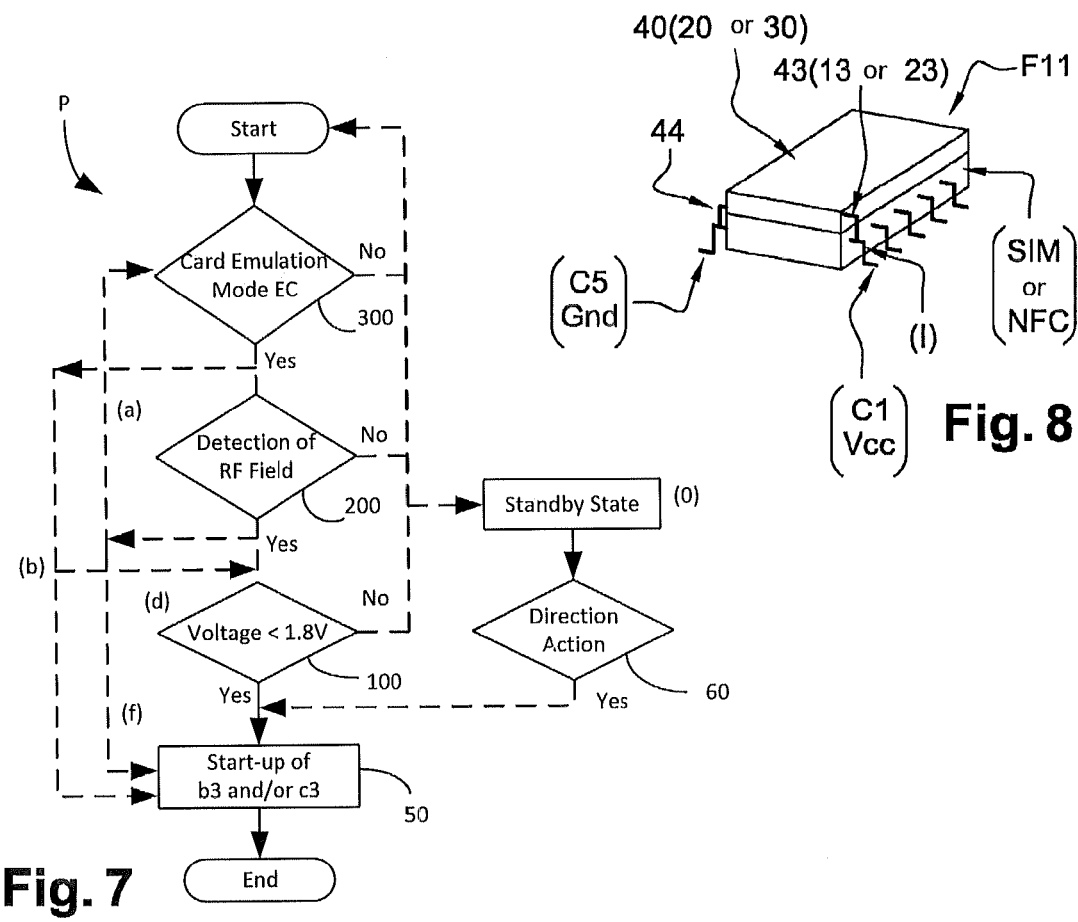
Fig. 7
Fig. 8

RADIO-FREQUENCY COMMUNICATION DEVICE COMPRISING A POWER SUPPLY OF ASSISTED RADIO-FREQUENCY ORIGIN

The invention concerns a radio-frequency communication device comprising means for supplying electrical energy of electromagnetic origin for supplying a component.

In particular, the invention concerns a portable (mobile) telephone comprising a battery supplying energy to a near field radio-frequency circuit (Near Field Communication—NFC) and implementing a mode in which all or part of the energy supply of the mobile is cut off, in particular the supply to a fixed or removable subscriber identification module (SIM, USIM), in favour of a supply of electromagnetic origin.

The near field radio-frequency circuit NFC is preferably integrated in a cable configured so as to be interposed between the SIM card and its connector in the mobile.

However, the NFC circuit may be integrated in the factory in removable or fixed form in telecommunication devices, such as mobile telephones, personal assistants PDA, portable computers, etc.

The standards ISO/IEC 14443 and ETSI TS 102 622 V7 provide for a functioning mode (contactless card emulation) for near field radio-frequency communication in which the mobile telephone (or at least the near field radio-frequency part of the telephone, comprising an NFC controller with a subscriber identification module) behaves as a contactless card or a passive electronic label vis-à-vis a reader emitting electromagnetic field. This mode emulates a contactless card or equivalent for the mobile telephone. At the present time, in the "contactless card" operating mode of a telephone with NFC function may not be completely satisfactory or in accordance with the standard or may have operating faults.

In addition, it is difficult to give an NFC function to a telephone that has no NFC controller. It is all the more difficult if an SWP (Single Wire Protocol) link is required between the NFC controller and the SIM of the mobile telephone.

Attempts to integrate an NFC or radio-frequency circuit in a telephone come up against problems of dimensions and/or space available in the telephone to integrate an NFC circuit as well as the problem of the metal environment of the telephone giving rise to electromagnetic disturbances. They also come up against a more or less unpredictable detrimental impact of the telephone battery on the radio-frequency characteristics of the NFC function.

The various constraints in implementing this NFC system in a mobile telephone environment mean that the contactless functioning degrades. These degradations are related to two main problems:
 a smaller antenna dimension than that of a contactless card;
 a very hostile radio-frequency environment: metal obstacles and interference by the other radio frequencies.

The degradation in functioning still remains acceptable when the contactless system is supplied by the telephone, but on the other hand it becomes very great when the telephone does not require energy (battery discharged or telephone switched off) and the contactless system (NFC circuit+component such as a card) is solely supplied by the radio-frequency field RF.

These NFC contactless systems will be used in installed instruments (transport, payment) where the required communication quality is identical to that of a contactless card.

It is therefore essential to guarantee functioning for the user whatever the energy state of his telephone.

The patent application EP 2 088 540 describes a portable electronic device for supplying an electronic circuit by battery in the case of detection of an electromagnetic field, the circuit not being supplied in the standby position. This device comprises selection means for selecting a supply for this circuit coming from the battery, when an electromagnetic field is present. This device avoids standby supply by battery.

The patent application JP 8 055198 describes a contactless integrated circuit card with a battery that saves on the battery when an electromagnetic field is received.

The card comprises a switch that disconnects the integrated circuit from the battery when an electromagnetic field is received. This switch connects the integrated circuit to the battery when the integrated circuit requires energy.

Moreover, contactless cards are known provided with a thin battery in the thickness of the card body in order to improve the range of contactless communication or to enable integrated arithmetic or cryptographic functions for displaying data. Such cards are marketed in particular by the company "Solicore".

These cards comprise passive radio-frequency circuits directly receiving the electromagnetic flux in order to be supplied directly. It is not a case of an NFC circuit supplying an integrated circuit or other distinct component external to the radio-frequency circuit. These cards do not implement a contactless object or contactless card reader function.

The problem to be solved is guaranteeing the same quality of functioning of the contactless application, whether the contactless system be supplied by the telephone or by the RF field.

The invention consists of integrating or associating an energy source such as a thin battery or at least one capacitor with the NFC or CLF component in order to boost or meet the current consumption requirements, in particular isolated ones or during radio-frequency transactions. These requirements may occur during certain phases of a radio-frequency contactless transaction, in particular the initial or start-up phase. The invention guarantees normal functioning of the component via a normal current consumption of the component throughout the duration of the radio-frequency transaction. The supplementary battery is charged, preferably by the main battery of the telephone when it is operational.

The invention has no significant impact on the functioning of the host device such as a mobile, the alternative energy source being recharged with extremely low currents that do not interfere with the functioning of the host device.

Unlike a card with a thin battery of the prior art referred to previously, the invention does not bring a permanent energy mode but a guarantee of using this energy only in the emergency case of the telephone being discharged or switched off, this makes it possible to envisage the use of energy storage objects having very low capacitances.

The subject matter of the invention is therefore a radio-frequency communication device comprising connection means connecting or intending to connect electrically an integrated-circuit component (SIM), means of supplying this component (SIM) with current of electromagnetic origin (RF).

It is distinguished in that it comprises an alternative power supply source for supplying said component (SIM) when an electromagnetic field is received as soon as the supply current of electromagnetic origin received by the component in insufficient.

Thus the invention makes it possible to stimulate or compensate for or overcome the insufficiency of main supply or the supply of radio-frequency origin provided by the device.

According to other features of the device:

it comprises a communication mode (EC) in contactless card emulation or equivalent configuration, said mode having a configuration of supplying the component (SIM) by means of a source of electromagnetic origin (RF) in substitution for a first source (B1) comprising a main battery, means for maintaining a level of current supply to the component by said alternative source, directly at it, in the case of a requirement for supply current during a radio-frequency communication in this emulation mode (EC);

the alternative source comprises a secondary battery and/or at least one capacitor;

the alternative source is rechargeable by a main battery of the device hosting the NFC system;

the alternative source intervenes in the event of the detection of an operating mode in which the current supply is of electromagnetic origin;

the component (SIM) comprises a subscriber identification module with a telecommunication network or an integrated circuit chip or a card of the UICC type;

the device comprises an NFC controller and a connection connecting or intended to connect the NFC controller to the component (SIM) in order to provide it with a supply of electromagnetic origin, a direct connection of the alternative source to the component (SIM) or via a means managing the alternative supply and/or means for conditioning said alternative source;

the device comprises an alternative power supply management means for managing an alternative direct supply to the component (SIM), a circuit for charging the alternative source connected to the main battery, a circuit for detecting an electromagnetic field acting with said manager in order to inhibit a discharge of the alternative source to the component (SIM) in the absence of detection of electromagnetic field and to enable discharge in the contrary case;

the battery or at least the capacitor is fixed to a portion of a flexible NFC device comprising the antenna;

the device comprises a NFC controller, connection pins for connecting firstly a main battery supply of a host device and secondly a subscriber identification module (SIM);

the battery and/or at least the capacitor and/or said alternative supply management means are fixed or integrated in an electronic component that may constitute or comprise an NFC controller and/or a subscriber identification module (SIM);

the host device is a mobile telephone.

Another subject matter of the invention is a radio-frequency communication method using at least one integrated-circuit component (SIM) and means for selecting a current supply of electromagnetic origin for supplying this component.

The method is distinguished in that it comprises a step of providing a power supply to the component (SIM) by means of an alternative source when an electromagnetic field is received as soon as the supply current of electromagnetic origin received by the component is insufficient.

The invention thus enables a functioning mode of the mobile in accordance with the standards but supplied at least over a short transaction start-up duration as if it were permanently outside the card emulation mode.

The invention makes it possible to have at all times the guarantee of optimised functioning of the NFC system in a mobile telephone whether it be added subsequently or provided in the factory.

The invention is described in relation to examples illustrated in the following figures:

FIG. 6 illustrates an apparatus provided at the time of manufacture thereof with the supply circuit in accordance with the invention;

FIG. 7 illustrates steps of the method in accordance with several embodiments;

FIG. 8 illustrates a component of the CMS type arranged with all or part of the invention. It describes in particular an NFC controller or SIM combined with a circuit comprising a mini battery or capacitors.

Figure 1:
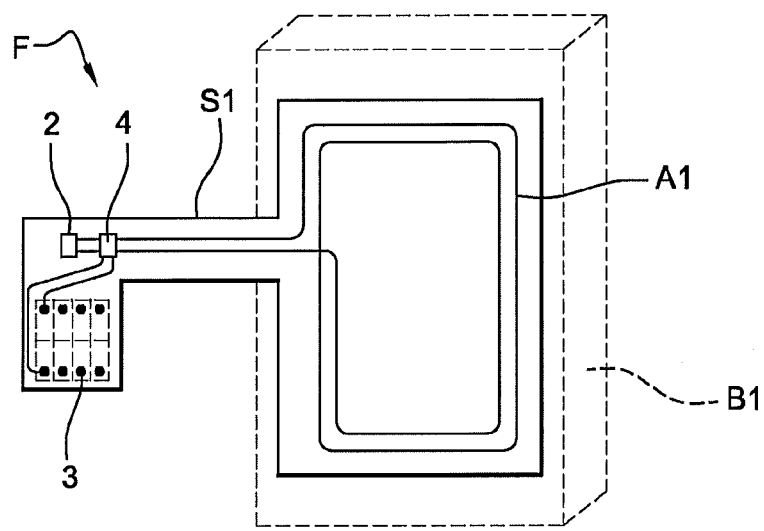
FIG. 1 illustrates a flexible NFC system F of the prior art.

FIG. 1 illustrates a flexible NFC system of the prior art; it comprises a flexible support S1 carrying a radio-frequency antenna A1, a NFC controller (2), means for managing the power supply (4) of the NFC controller connected or being configured to be able to be connected to the battery and/or to the radio-frequency antenna A1, a connector (3, 6) with pins 3 and contact pads 6 respectively emerging or disposed on one of the two main faces of a part intended to come to be interfaced between a connector 10 (blade or spring connector) of a telecommunication apparatus 5 for a SIM module and contact pads of the SIM module. The appliance may also be a communication appliance such as a personal assistant or any appliance comprising a battery that it is wished to provide with contactless communication means. Where applicable, the NFC controller may comprise internally the power supply management means 4.

This system (S1) is housed in a host device 5 such as a telecommunication apparatus, the antenna, for example, being able to be pressed against a battery B1 (FIG. 1) of this host device.

Figure 2:
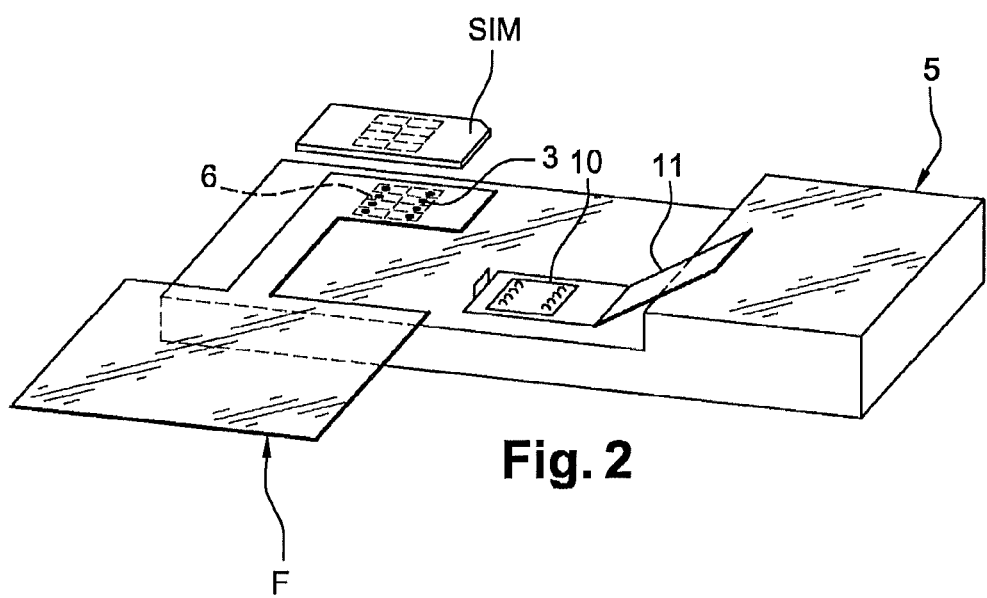
FIG. 2 illustrates the system F in the course of insertion in a telecommunication apparatus 5.

In FIG. 2, the flexible NFC system (F) is in the course of being inserted in a telecommunication apparatus 5. The connecting part 3, 6 is intended to be interfaced between the connector 10 of the mobile 5 and a SIM module held (by a holding member or flap 11) in contact with the connector 10. The part of the antenna A1 may be folded flexibly and be placed for example against the main surface of the battery (B1).

Figure 3:
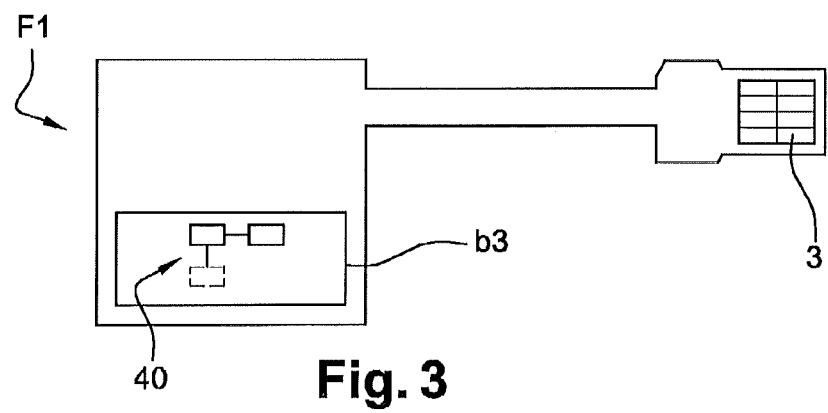
FIG. 3 illustrates an external view of a flexible NFC system according to the invention.

FIG. 3 illustrates a flexible NFC system F1 comprising the flexible system of the prior art F equipped with the device of the invention. It comprises in particular a flexible thin battery b3 and a supplementary power supply circuit 40 in accordance with the invention for managing the use of this supplementary battery as detailed below.

Figure 4:
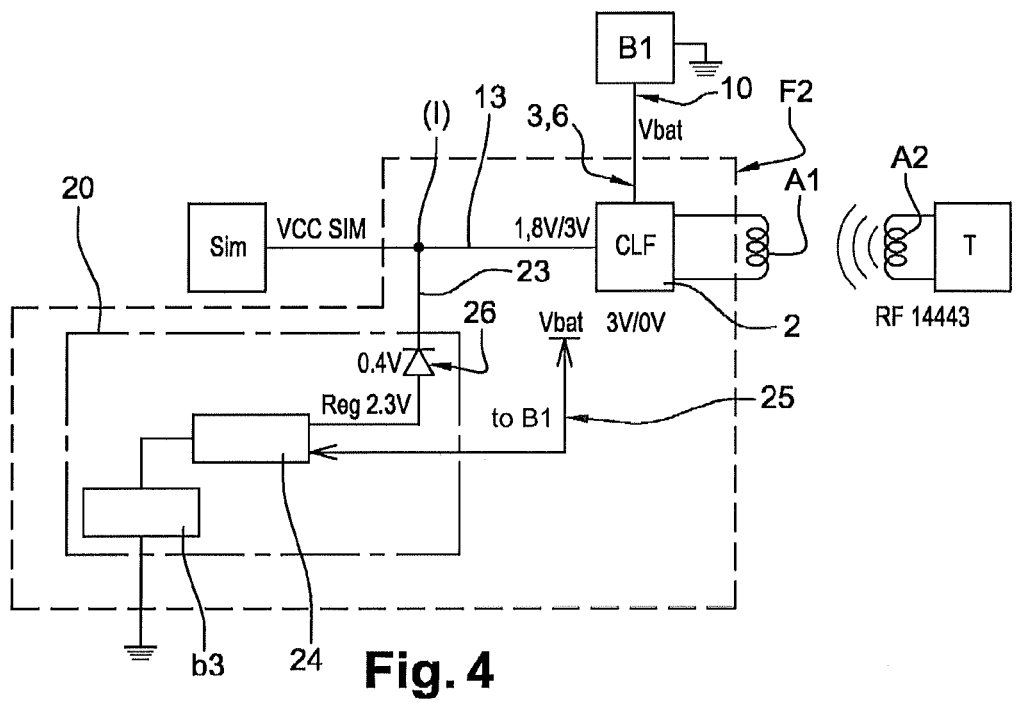
FIG. 4 illustrates a first embodiment of the supply circuit in accordance with the invention.

FIG. 4 illustrates a block diagram of an embodiment of a power supply device 20 for a radio-frequency communication device F1 according to the invention; the communication device comprises at least one integrated-circuit component (SIM or the like) or means of connection to this component (SIM), as before, means 2, 4 for selecting a current supply for this component coming from an electromagnetic field of an external reader (T, A2).

In the example, the device is the flexible NFC system (F), which comprises an integrated circuit chip 2 as a radio-frequency component or controller of the NFC type (CLF). The NFC controller is connected to an antenna A1 for emitting and/or receiving an electromagnetic field. The controller 2 comprises means 13 for connection to the battery. These connection means in this case comprise contact pads of the ISO 7816 type (3, 6).

According to one feature of an embodiment of the invention, alternative power supply means b3 are provided for the component independently of the battery B1 of the host telecommunication apparatus. These alternative means are configured to overcome any insufficiency of supply current/voltage of the SIM component coming from the electromagnetic field.

The component is here a subscriber identification chip but could be all or part of a circuit of an associated apparatus.

The circuit 2 (CLF) is designed so as to supply a standardised voltage to the SIM chip of between 1.8 and 3 volts.

The connection means 3 is in fact in the example an interconnection means (I) that comprises a first connector 13 for connecting the NFC controller (2). Moreover, the interconnection means also comprises a second connector (3, 6) for connecting a subscriber identification module (SIM) and the connector 10 of the portable telecommunication apparatus 5.

According to another embodiment (FIG. 4), the radio-frequency communication device F2 comprises:
an integrated-circuit component (SIM) and/or means 3, 6 of connection to the this SIM component for at least supplying it with current/voltage;
means (3, 6) of connection to a first energy source B1 comprising a battery and/or a second source T using an electromagnetic field RF 1443;
a mode EC of functioning in contactless card emulation or an equivalent radio-frequency functioning;
means 2, 4 for managing the power supply of the component according to this mode, configured to cut off the supply coming from said first energy source B1 and to provide instead a supply coming from said second external source T. This source emits an electromagnetic field (RF 14443) through an emitting antenna A2.

According to one feature of this embodiment, the device F2 comprises:
a third energy source b3 such as a secondary or ancillary battery or at least one capacitor C3 (not shown) for direct supply of the SIM component in said mode (EC),
direct means 23 (for example a conductive wire) for supplying power to the component by means of this third energy source b3 in the event of a supply to the component that is insufficient or not provided by said second source (T) during a radio-frequency communication RF.

The direct power supply means 23 may comprise, in a simple example, a simple direct connection for the electrical supply to the SIM component connecting the source b3 and/or c3 to the component (SIM).

The ancillary battery is of the flexible flat type approximately 300 µm thick. It may be fixed to the flexible NFC device, for example at the internal surface of the antenna A1 (FIG. 3). Advantageously, the flexible battery does not entirely cover the coupling surface of the antenna A1 in order maintain good radio-frequency coupling.

According to one feature of the invention, the alternative supply means b3, C3 are rechargeable. In the example, they are here rechargeable by the main battery B1. However, other recharging methods are possible, directly or for example via photovoltaic sensors, etc.

The device therefore comprises for this purpose a circuit 24 for charging or managing the charging and/or discharging of the ancillary battery b3 or C3.

This circuit 24 is connected directly to the main battery B1 by a connection 25 in order to draw therefrom the charging energy.

Preferably, the device F2 may comprise a diode 26 or equivalent for delivering a voltage that is attenuated compared with that delivered by the battery b3. The attenuation is here 0.4 volts. The diode is disposed on the connection 24 before connecting the SIM module.

By means of this diode, the discharge management circuit delivers a voltage (1.9 V) that is just above the minimum voltage (1.8 V) supplied by the CLF controller (2). The ancillary battery b3 delivers a regulated voltage of 2.3 V through the discharge manager 24.

Figure 5:
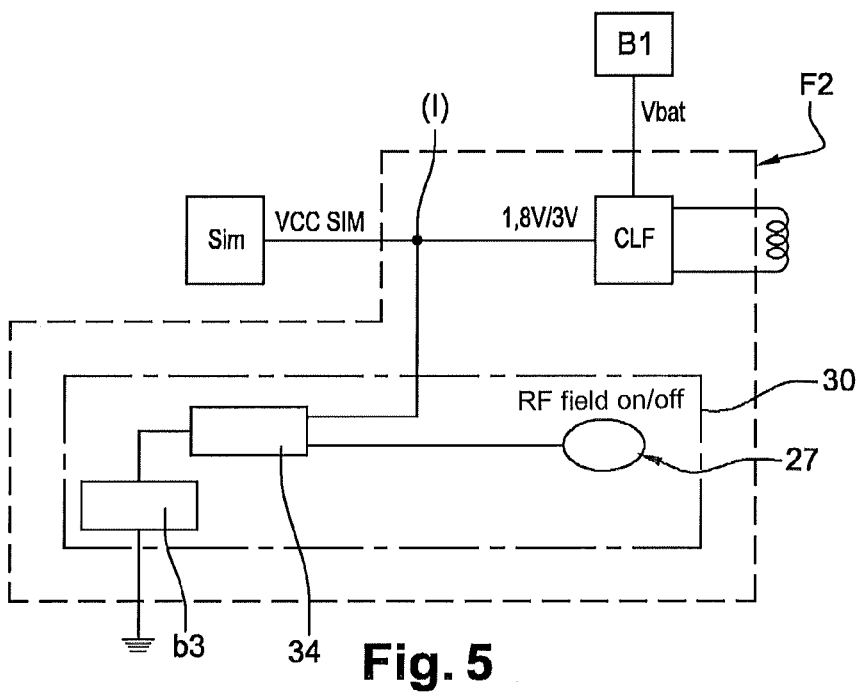
FIG. 5 illustrates a second embodiment of the supply circuit according to the invention.

In FIG. 5, an additional supply circuit 30 comprises the flexible ancillary battery and the charging/discharging management electronics 34 and the diode 26. This additional circuit is closely fixed to the flexible NFC device.

In the description, the same references designate identical or similar components.

According to one feature of one embodiment, the device comprises a controller 2 (NFC), a direct connection between alternative supply means and the component (SIM), a field detection circuit (27), a circuit for charging in normal mode, and a circuit for blocking discharge in the absence of an electromagnetic field (34).

This above mode is illustrated by an example in FIG. 5. The additional circuit 20 also comprises an electromagnetic field detector 27 connected to the supply manager of the SIM card.

The function of the manager 34 is to detect the presence of a radio-frequency field and to enable discharge of the battery b3 only during an RF communication. For this purpose, the manager 34 may comprise at least the functions of the circuit 24 (FIG. 4), a program loaded into a program memory of a controller of the manager. The above function can be implemented in cabled form. The manager may be a component of the MAX11710 type.

According to this function, the discharge of the battery is blocked when there is no radio-frequency field. The circuit 34 may comprise in particular a logic gate or an electromagnetic switch or a relay that isolates the battery b3 from the SIM. This makes it possible not to discharge the battery or capacitor(s) C3 unnecessarily through a possible leakage current.

When a sufficient communication field is detected, discharge of the battery and/or capacitor(s) is enabled in order to supply the SIM.

This manager may comprise means configured to allow charging of the battery b3 and/or capacitor(s) C3 in particular when the apparatus is powered up and/or to prevent discharge thereof in the absence of a radio-frequency communication RF.

The alternative supply means b3, c3 may act in support of or substitution for the supply of the component (SIM) in the event of detection of an insufficient current/voltage at their terminal. It may also act in the case of detection of an operating mode in which the supply of current is provided by the electromagnetic field RF such as the card emulation mode EC.

FIG. 6 illustrates a communication apparatus 50 comprising a circuit 2 (NFC or CLF) in communication and electrical supply relationship with a SIM card or UICC (the acronym for universal integrated circuit card) in accordance with ISO/IEC 14443.

The UICC component or the corresponding electronic chip may be removable or soldered in the apparatus. The communication between the SIM and the CLF controller takes place by connection of the SWP type. The CLF controller may be provided in this apparatus in the factory.

The apparatus may comprise, factory mounted or removably, at the junction (I) with the SIM, the additional circuit 40 of the invention, in accordance with the circuits 20 or 30 in FIG. 4 or 5. This circuit is connected to the SIM by the point (I) corresponding to the point "Vcc" of the connector of the mobile.

FIG. 7 illustrates preferred steps of the radio-frequency communication method implemented by the various modes above.

This method requires at least one electronic component and means of selecting a current supply to this component coming from an electromagnetic field of an external reader.

According to a preferred embodiment, the method of the invention comprises a step of alternative direct supply of the component independently of a main battery. This supply is implemented solely to overcome any insufficiency of supply current or voltage for the component coming from the electromagnetic field.

Step 50 illustrates this supply by an activation of the complementary battery b3 or of at least one capacitor C3 in the circuits 20, 30 or 40.

This activation may be triggered in several ways either individual or cumulative with one another according to various variants described below.

Thus the activation may be triggered by a direct action step 60, performed for example manually, on a switch (not shown) installed on a connection 23 (FIG. 4) connecting b3 or c3 directly to the component in particular at point (I). This switch may be housed in or also consist functionally of the component 34.

At step 100, the method comprises a step of detecting a requirement for current that occurs when the voltage at the terminals of the SIM is below 1.8 V or 1.9 V. In the positive case, the activation of the battery b3 or capacitor C3 occurs. In the negative case, the program loops back to 200, 300 or goes into a standby or stationary state (0).

The detection 100 may be simply physical because of a state of potential difference at point (I) between the connections 13 and 23.

At step 200, a radio-frequency field is detected, in particular by a detector 27 comprising a coil and being connected to the manager 34. This detector is configured so as to transmit, for example in logic form, a high or low state to the manager 34 according to the presence or not of a radio-frequency field having expected characteristics. This detection is implemented by the circuit 27 in FIG. 5.

In the case of the presence of a field, the program can loop back directly onto operation 50 (path f) or onto step 30 (path a) or alternatively, according to another embodiment, onto the test 100 described previously.

In the contrary case, absence of field (no), the program can loop back onto a test (300) or go onto standby (0).

In step 300, the method comprises a step of detecting an operating mode in contactless card emulation (EC). This mode can be triggered in various ways, in particular by default, by intentional action, by communication protocol in the case in particular of exchanges between mobile telephones in so-called peer to peer communication, in the case where the battery is absent, discharged or deactivated during a powering down of the apparatus 5.

In the positive case (yes), the program can switch directly to the operation 50 of activating an alternative supply b3, C3 (path b). It may alternatively switch to at least one supplementary test 100 (detection of voltage <1.8 V) (path d) and/or onto the test 200 (detection of RF field).

In the contrary case (absence of field), the program or method loops back to the start or to a standby state (0) or to one of the other tests (100, 200, 300).

According to another more general implementation of the method, the method for radio-frequency communication with a device has a contactless card emulation mode (EC) or equivalent configuration.

The method implements a communication step in a contactless card emulation mode (EC) or equivalent communication, said mode having a configuration of supply of the component (SIM) by an original electromagnetic source in substitution for a first source (B1) comprising a battery.

The method it distinguished in that it comprises:
  a step according to which the component is provided with an alternative supply source, such as a battery or at least one capacitor,
  a step of maintaining a level of supply of current to the component by said alternative source, directly with it, in the case of a need for current supply during a radio-frequency communication.

The device is preferably a mobile telephone supplying an NFC circuit by battery B1 and the component is preferably a subscriber identification module, such as a SIM card and/or an NFC circuit. The NFC component may housed in the SIM card or other cards such as an SD or SD micro card. The SD micro card may therefore also comprise a battery b3 and/or capacitors c3 in accordance with the invention with the management circuits 20, 30 or 40.

FIG. 8 illustrates an embodiment of the invention in the form of at least one electronic component F11. The circuit 40 is miniaturised and is arranged compactly on an electronic component to be supplied (SIM), for example according to EC mode.

The component (SIM) is here in SMC (surface mounted component) form, parallelepipedal in shape. It comprises the electrical connections or lugs C1 to C5 corresponding to the contact pads of a chip card.

The circuit 40 is compacted to the dimensions of the surface of the SMC component, also in the form of an SMC component with at least two connection lugs 43, 44 corresponding respectively to the connection 23 and to earth. These two lugs are here connected in particular by soldering to the lugs C5 and C1 of the SIM.

Alternatively, the component (SIM) may be replaced by the component (NFC), and the element 40 then comprises one of the circuits 20 or 30 comprising in particular the auxiliary battery b3 or capacitor C3, or the supply manager 24 or 34. The lugs C1-C5 are adapted accordingly to the necessary connections of the component 2 (NFC). In this case the lug 43 corresponds to the connection 23 of the manager 24, 34 (FIG. 4 or 5).

Thus the invention proposes a component F11, in particular NFC, provided with a self-contained energy source integrated or juxtaposed so as to deliver energy immediately to a component to be supplied, such as a SIM card, without awaiting a transformation of an energy of electromagnetic origin, which may comprise a fault or insufficiency.

The invention makes it possible to deliver a more calibrated/stabilised voltage in the case of transformation and supply of energy by radio-frequency field.

According to other functionalities, the invention provides one or more assistance modes to the main battery of the NFC system. These modes may be made concrete by an assistance program (AS) in the NFC controller and a I/O port connected to the supply manager 24 of the component or components. These modes may be configured to provide information on radio-frequency field present and main battery energy absent. A signal on this port is used by the alternative supply management means 24, 34 for activating the alternative capacitor or battery for supplying the component or any other component or circuit.

According to a variant embodiment, the invention provides for the NFC controller to itself deliver the field presence information detected by its own antenna A1 (in this case, the means 27 in FIG. 5 is unnecessary, its function being fulfilled by the NFC controller). The NFC controller may deliver battery discharged or absent or out of service information. In this case, a configuration is provided in which at least one I/O port is kept operational unlike the current configuration of the controllers. The invention provides an adaptation in this sense of the current micro software or functioning of the NFC controller, since, in the prior art, the I/O ports of the NFC controller are inactive in the case of absence of main battery or mode of non-supply of the NFC controller by the main battery.

The manager 24 or 34 may be integrated in the NFC controller so as to deliver alternative energy to the component (SIM). The information delivered on its aforementioned I/O port can then be directly directed internally to the manager 24, 34 as integrated.

The invention provides an NFC controller provided with a field detection device (such as 27), which makes it necessary to function at 3 V for the SIM in activated battery mode. (In this case, there is no current drawn from the alternative source when the radio-frequency field is present and the telephone is switched on).

Thus the NFC controller can be configured to deliver or use field presence information and/or information relating to a main battery energy level absent or present so as to put the alternative source in service or not for supplying the component.

The invention claimed is:

1. Radio-frequency communication device comprising:
   connection means connecting or intended to connect electrically an integrated circuit component with a first source of energy,
   a first supply managing circuit responsive to detection of an electromagnetic field for:
   (i) disconnecting the first source of energy from the integrated circuit component while the electromagnetic field is present, and
   (ii) supplying said component with current of electromagnetic origin that is derived from the detected electromagnetic field,
   an alternative supply source for supplying said component, and
   a second additional supply managing circuit for managing the use of said alternative supply source for supplying said component, wherein said second additional supply managing circuit is separate from said first supply managing circuit and is configured to operate when energy supplied to the first supply managing circuit is insufficient.

2. Radio-frequency communication device according to claim 1, further comprising:
   a mode for communication in contactless card emulation or equivalent configuration, said mode having a configuration of supply of the component by a source of electromagnetic origin in substitution for the first source of energy comprising a main battery, and
   means for maintaining a level of supply of current to the component by said alternative source, directly with it, in the case of a requirement for supply current in the course of a radio-frequency communication in said emulation mode.

3. Device according to claim 2, further comprising an NFC controller, and connection pins for connecting firstly a main supply battery of a host device and secondly a subscriber identification module.

4. Device according to claim 1, wherein said alternative source comprises a secondary battery and/or at least one capacitor.

5. Device according to claim 4, wherein the battery is of the flexible or supple type.

6. Device according to claim 4, wherein the battery or at least the capacitor is fixed to a portion of a flexible NFC device comprising the antenna.

7. Device according to claim 4, wherein the battery and/or at least the capacitor and/or said alternative supply management means are fixed to or integrated in an electronic component comprising an NFC controller and/or a subscriber identification module.

8. Radio-frequency communication device according to claim 7, wherein the NFC controller is configured to deliver or use field presence information and/or information relating to a main battery energy level absent or present so as to put the alternative source in service or not for supplying the component.

9. Device according to claim 1, wherein said second additional supply managing circuit manages the alternative source to act in the case of detection of a functioning mode in which the supply of current is of electromagnetic origin.

10. Device according to claim 1, wherein said component comprises an identification module for a subscriber to a telecommunication network or an integrated circuit chip or a card of the UICC type.

11. Device according to claim 1, wherein the device comprises an NFC controller and a connection connecting or intended to connect the NFC controller to the component in order provide the component, with a supply of electromagnetic origin.

12. Device according to claim 1, wherein said second additional supply managing circuit operates said alternative supply source for supplying said component when the electromagnetic field is present and the supply current of electromagnetic origin received by the component is insufficient.

13. Radio-frequency communication device comprising:
   connection means connecting or intended to connect electrically an integrated circuit component,
   means for supplying said component with current of electromagnetic origin,
   an alternative supply source for supplying said component when an electromagnetic field is received as soon as the supply current of electromagnetic origin received by the component is insufficient,
   a means for managing an alternative supply for managing an alternative direct supply for the component,
   a circuit for charging the alternative source connected to a main battery, and
   an electromagnetic field detection circuit acting with said management means for inhibiting a discharging of the alternative source to the component in the absence of detection of electromagnetic field and for enabling discharging in the contrary case.

14. Radio-frequency communication method using at least one integrated circuit component electrically connected with a first source of energy and a first supply managing circuit responsive to detection of an electromagnetic field for supplying current of electromagnetic origin that is derived from the detected electromagnetic field for supplying said component,
  comprising a step of disconnecting the first source of energy from the integrated circuit component while the electromagnetic field is present, and
  comprising a step of providing a supply to the component by means of an alternative source, wherein
  said alternative source is managed by a second additional supply managing circuit for managing the use of said alternative source for supplying said component, said second additional supply managing circuit being separate from said first supply managing circuit and configured to operate when energy supplied to said first supply managing circuit is insufficient.

15. Radio-frequency communication method according to claim 14, the communication taking place in a contactless card emulation mode or equivalent configuration, said mode having a configuration of supply of the component by a source of electromagnetic origin in substitution for the first source of energy comprising a battery, comprising:
  a step according to which the component is provided with an alternative supply source, such as a battery or at least one capacitor, and
  a step of maintaining a level of supply of current to the component by said alternative source, directly with it, in the case of a requirement for supply current during a radio-frequency communication in this emulation mode.

16. Radio-frequency communication method according to claim 14, wherein the step of providing supply to the component by means of the alternative source occurs at least at an initial or start-up phase of a radio-frequency contactless transaction with an external reader.

17. Radio-frequency communication method according to claim 14, wherein said second additional supply managing circuit operates said alternative source for supplying said component when the electromagnetic field is present and the supply current of electromagnetic origin received by the component is insufficient.

* * * * *